Figure 1:
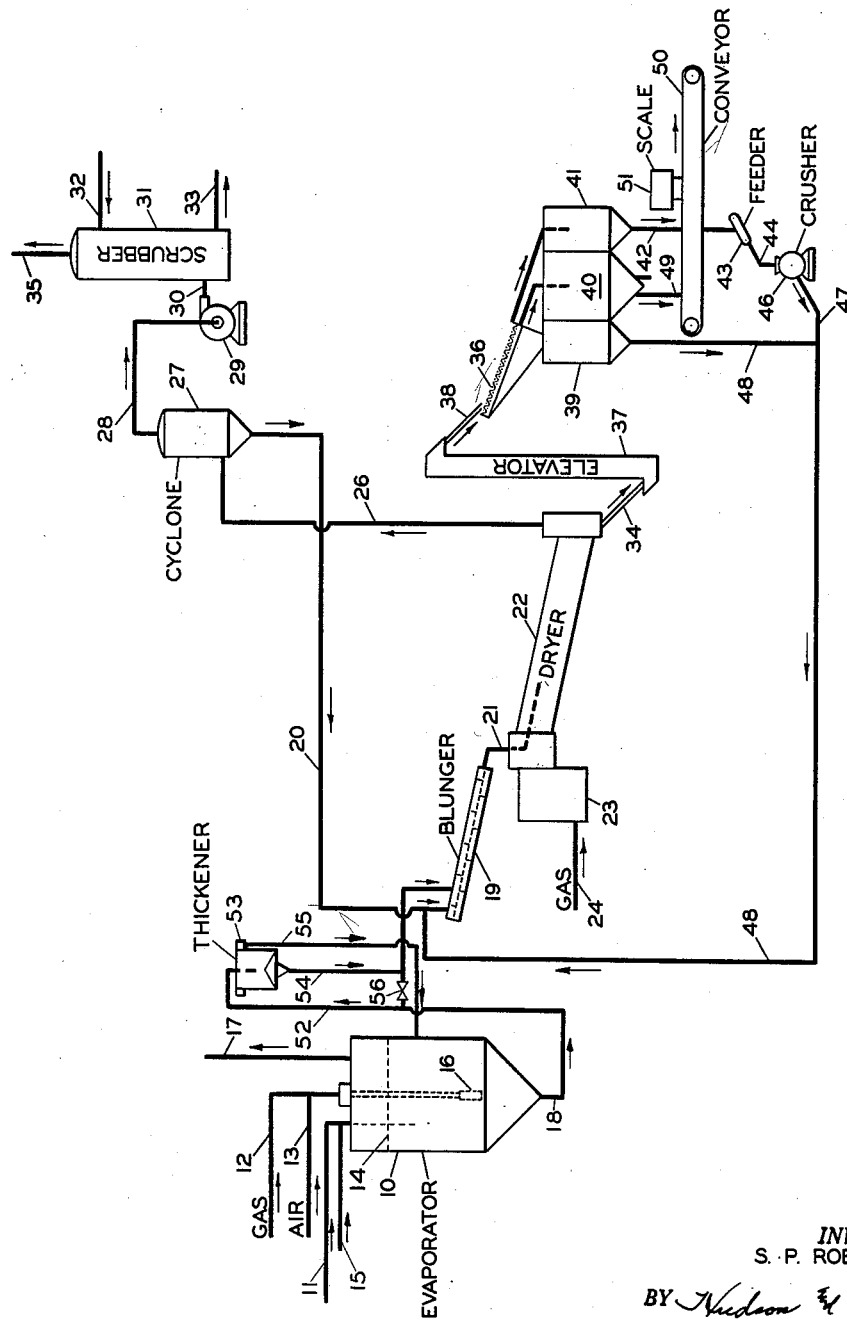

INVENTOR.
S. P. ROBINSON

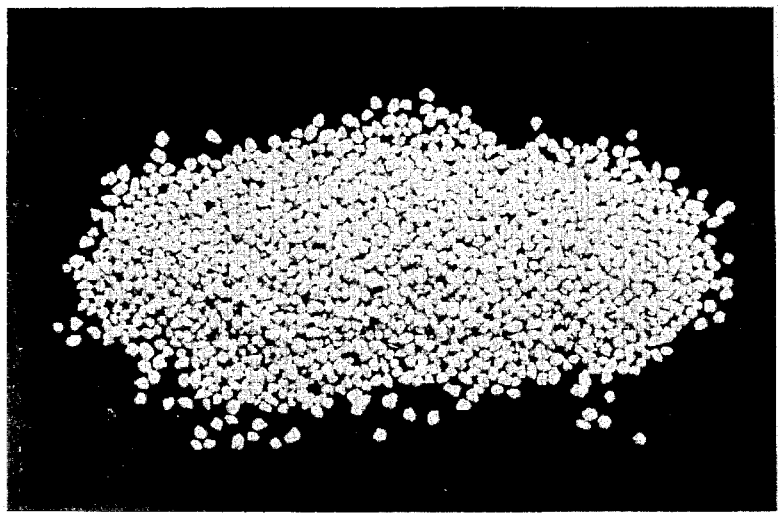
FIG. 2 GRANULAR AMMONIUM SULFATE
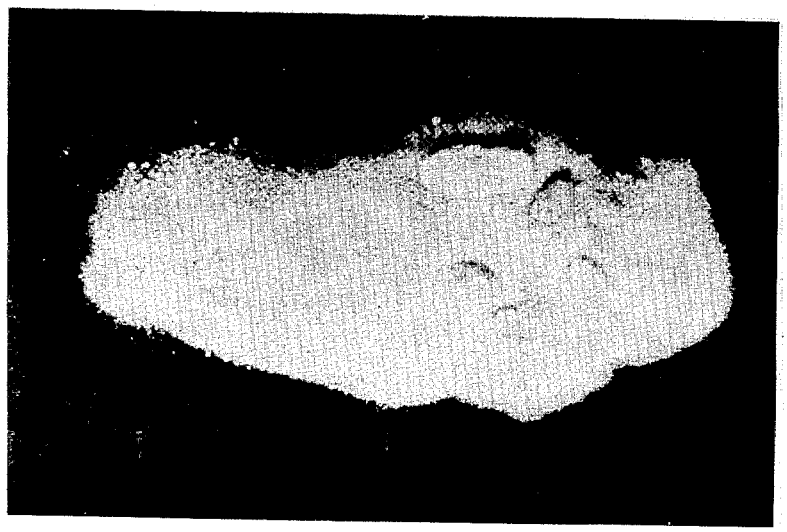
FIG. 3 CRYSTALLINE AMMONIUM SULFATE March 10, 1953  S. P. ROBINSON  2,631,084
AMMONIUM SULFATE PRODUCTION
Filed Dec. 29, 1948  3 Sheets-Sheet 3
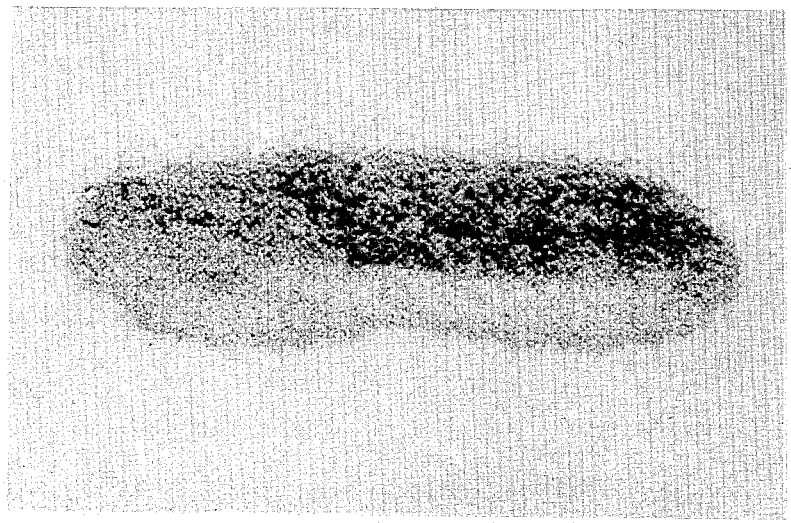
FIG. 4 CRYSTALLINE AMMONIUM SULFATE
INVENTOR.
SAM P. ROBINSON
BY
Hudson and Young
ATTORNEYS Patented Mar. 10, 1953

2,631,084

UNITED STATES PATENT OFFICE 2,631,084

AMMONIUM SULFATE PRODUCTION

Sam P. Robinson, Bartlesville, Okla., assignor to Phillips Petroleum Company, a corporation of Delaware Application December 29, 1948, Serial No. 68,023

10 Claims. (Cl. 23—119)

This invention relates to granular ammonium sulfate and to a process for making same. In one of its more specific aspects it relates to the manufacture of ammonium sulfate crystal magma. In a preferred embodiment this invention relates to a process for making an improved ammonium sulfate crystal magma for manufacturing an ammonium sulfate especially adaptable for use as fertilizer, and to the granular product which is a new article of manufacture.

There are numerous processes whereby ammonium sulfate crystals are prepared, however, there seem to be disadvantages of one sort or another to each of them. Broadly, there are two processes of making solutions of ammonium sulfate, namely, the direct reaction of ammonia or ammonia-containing gas with sulfuric acid or solutions containing same; and the gypsum process wherein calcium sulfate is reacted with ammonium carbonate. The products of either of these two processes are essentially the same, i. e., they are aqueous solutions of ammonium sulfate.

The best known and probably the most often produced ammonium sulfate crystal structure is that which is described as "needle-like," having much greater length than either height or breadth. However, when crystals of this type are formed the difficulties just begin. Two of these difficulties are of particular interest to the industry and their circumvention is of importance. These long needle-like crystals on drying tend to mat and cause stoppages in filtering and drying equipment which necessitates shutting down and cleaning equipment. Further, after storage for extended periods of time the crystals tend to bridge and cement together thus causing excessive handling difficulties. Because of the property of matting and caking it is quite apparent that such a material will be difficult to use as a fertilizer because of the difficulty in feeding through even the highly specialized farm equipment in use today. Such feeding difficulties will cause uneven coverage of the land and will render the use of such fertilizer less economical.

An object of this invention is to provide a process for making magma.

Another object is to make improved ammonium sulfate crystal magma.

Another object of this invention is to manufacture ammonium sulfate crystal magma of higher crystal solids content than heretofore produced and wherein the crystals are of exceptionally small size.

Another object of this invention is to provide improved ammonium sulfate crystal magma for use in granulation processes.

Another object is to provide as a new article of manufacture: granular ammonium sulfate.

Another object is to provide a process for the manufacture of improved granular ammonium sulfate which will not cake, bridge, or cement together, thus, causing feeding difficulties in farm machinery.

Another object is to produce a product of high bulk density which will allow savings in package costs.

Further objects of this invention will be apparent from the accompanying disclosure and discussion.

I have discovered a process for making improved ammonium sulfate crystal magma for use in the manufacture of granulated ammonium sulfate fertilizers wherein the ammonium sulfate crystals are of particularly small size and in large quantities of 30 per cent to 80 to 85 per cent total solids.

The term "magma" as used in this specification refers to a mixture of ammonium sulfate solids and saturated mother liquor in which appreciable quantities of the total ammonium sulfate is in a solid crystal form. The term "blunger" as used herein designates a mixing apparatus generally containing paddles or the like.

The art of granulation, or forming large particles of materials by combining, by various means, smaller particles of these materials, has been known for some time. For example, small particles of a material may be made to stick to one another by first moistening them and then contacting them with one another by such means as tumbling and the like. My invention relates to the preparation of an improved ammonium sulfate crystal magma to be used as a feed stock for such granulation process and to the product granular ammonium sulfate.

In accordance with my invention in preferred embodiment an aqueous solution of ammonium sulfate (without any crystals therein) which is to be concentrated to a magma and used as a feed for granulation is passed to a submerged flame concentrator or evaporator. In this type of evaporator a gas such as natural gas is burned below the liquid level of the material therein to supply heat for the evaporation of the water. Large quantities of flue gas are generated below the surface of the ammonium sulfate solution by thus burning the gas, which to escape must pass upwardly through the solution and to a stack. The removal of the water from the solution in the form of vapor raises the concentration of the ammonium sulfate until crystals are formed. Such crystals in a solution of ammonium sulfate, form a magma. The flue gas passing through the ammonium sulfate solution causes considerable turbulence, flash dehydration, and flash crystallization. These conditions are favorable for high crystal nuclei formation and minimum growth of these nuclei. It is these small crystal nuclei which make the most desirable magma for feed to granulation equipment because they have not been allowed to grow to the long needle-like crystals which would normally result if crystal growth was not inhibited. By so treating the ammonium sulfate solution and forming small crystals, a magma of over 30 per cent and up to 80 to 85 per cent crystal solids may be obtained without any attendant operational difficulties.

Further improvement of the crystal magma, i. e., making a magma of a high solids content of small crystals, in accordance with preferred aspects of my invention, may be had by taking off a side stream of the saturated ammonium sulfate solution and crystal nuclei or magma and passing same to a continuous thickener, such as a traction or tray or filter thickener similar to those shown in the Chemical Engineer's Handbook (2nd edition, John H. Perry, editor-in-chief, McGraw-Hill Book Company), and thereby removing some of the excess ammonium sulfate solution or mother liquor. Thus removed mother liquor is then passed back to the submerged flame evaporator for further evaporation. By using such a thickener part of the drying load is taken off the subsequent dryer and the ratio of recycled dried material to new magma can be reduced with an appreciable saving in dryer size and drying costs.

The crystal magma may be further improved by the use of certain additives in the ammonium sulfate solution which is fed to the submerged flame evaporator. Such additives, or crystal growth inhibitors, as alum or aluminum sulfate and other water-soluble salts of trivalent aluminum, chromium, iron, manganese, etc., used in quantities of from 0.1 to 5.0 weight per cent but preferably of from 0.1 to 1.0 weight per cent, based on the dissolved ammonium sulfate, inhibit crystal nuclei growth, and thus reduce the viscosity of the crystal slurries or magma for a given crystal solids content, and enable making slurries of higher crystal solids content in the submerged flame concentrator without encountering operating difficulties. By so operating a magma containing crystal of only 1 to 50, and preferably 5 to 10 microns length as an average may be obtained.

The improved crystal magma produced in accordance with my invention by utilizing a submerged flame concentrator is passed to a blunger. For maximum efficiency in the granulation of ammonium sulfate it is a prerequisite that the magma fed to the blunger contains a high percentage of small crystals which must not have a long needle-like structure. The magma of my invention is of such character. The blunger is a mixing device comprising a hollow tube with a shaft running along its axis to which are attached a number of blades or paddles which when the shaft is rotated mix whatever material may be introduced thereto. The crystal magma which contains more than 30 per cent crystal solids and preferably as much as 80 to 85 per cent crystal solids is admixed in the blunger with recycle dry ammonium sulfate granules. These granules are larger than the crystals in the magma from the submerged flame concentrator. Some of them which are returned to the blunger are not quite large enough to meet specifications such as for fertilizer and the like; while others are fragments of granules which are of too great a size to comply with specifications and which have been reduced in size by crushing. Still others are very fine particles recovered from the gas used to dry the ammonium sulfate granules. Sufficient quantities of the recycle fines are introduced to the magma at the head of the blunger to maintain the moisture content of the total mixture at not more than about 1 to 10 weight per cent and preferably not more than 2 to 3 weight per cent.

In the blunger the small crystals produced in the submerged flame concentrator adhere to the recycle granules due to the tackiness of the saturated mother liquor present, thus building up the size of the granules during the mixing in the blunger. The granules thus enlarged by the small crystals sticking to them pass to a dryer, preferably a rotary dryer, where all of the remaining moisture is removed and the small crystals become cemented to the recycle granules by crystallization of the ammonium sulfate mother liquor when the water content is evaporated. To form solid granules which will not break easily and which will have a minimum of void space between the crystals thereof, it is essential that the crystals cemented together be of a minimum size and not of a needle-like shape. By a minimum of void space I mean that the space between the cemented crystals will be as small as possible because of the very small crystals used, i. e., 1 to 50, though most usually 5 to 10 microns average length. The presence of the crystal growth inhibitors such as have been previously described will continue to inhibit the formation of any but the smallest crystals in both the blunging and drying steps.

A further understanding of some of the many aspects of my invention may be had by referring to the attached drawings. Figure 1 is a schematic flow diagram of a preferred embodiment of my invention. Various additional valves, pumps, and other conventional equipment, necessary for the practice of my invention, will be familiar to one skilled in the art and have been omitted from the drawing for the sake of clarity. Figures 2, 3, and 4 are photographs of three types of dry ammonium sulfates, Figure 2 being granules of the present invention.

The following description, which will also serve to exemplify my invention, provides one method of operating my process. It is understood, however, while this is representative in general of my process, various minor changes may be made in adapting the process to the various conditions within the scope of the invention.

Refer now to the drawing. An ammonium sulfate solution is introduced to submerged flame evaporator 10 via line 11 for concentrating. Gas and air are introduced to the evaporator through lines 12 and 13 and are burned below the liquid level 14 of the ammonium sulfate in burner 16. The hot combustion gases pass upwardly through the ammonium sulfate removing water in the form of steam, thus increasing the concentration of ammonium sulfate. If crystal growth inhibitors previously discussed are to be used they may be introduced to the ammonium sulfate solution in line 11 by means of line 15. The combustion gases and water vapor are exhausted from evaporator 10 via line 17. By thus removing the water from the ammonium sulfate, the ammonium sulfate is brought to a concentration at which crystallization takes place.

The crystal containing solution from evaporator 10 may be passed directly to blunger 19 via line 18, or more preferably, through a thickener and then to the blunger. When operating in this preferred manner, valve 56 may be closed or partially closed depending on the thickness of the magma desired. The magma from evaporator 10 is passed via lines 18 and 52 to thickener 53 which may be of any conventional design. Mother liquor, which is an ammonium sulfate solution, is removed from thickener 53 via line 55 and passed back to evaporator 10. The thickened magma is removed from thickener 53 via line 54 and is passed via line 18 to blunger 19.

Recycle fines are introduced via line 20 to the blunger where they are mixed with the crystal magma. The blunger thoroughly mixes the fines with the magma so that the fine crystals will come in contact with the larger particles and adhere thereto. In this way a granule increases in size as it passes through the blunger. The thus formed granules are passed from blunger 19 via line 21 to rotary dryer 22. Gases utilized for drying the granules, that is, for removing the last 2 to 3 per cent of moisture, are preferably heated to cause more rapid evaporation of the moisture. It is very satisfactory to use flue gas from a dutch oven such as is indicated by number 23 to which gas to be burned is introduced via line 24. The hot gases contact the granules as they are tumbled in dryer 22 and are then removed from the dryer via line 26. The drying gases which are removed via line 26 are passed to cyclone separator 27 which removes small entrained particles of ammonium sulfate. The gas, freed of ammonium sulfate, is then passed from the cyclone separator via line 28, blower 29, and line 30 to scrubber 31 where any gaseous ammonia is recovered therefrom by washing the drying gas with water introduced via line 32 and removed via line 33 or by any other suitable means. The scrubbed gases are removed from scrubber 31 via line 35. The separated ammonium sulfate fines are removed from the bottom of cyclone separator 27 and passed via line 20 to the blunger.

Product ammonium sulfate is removed from dryer 22 via conduit 34 and passed to a screening apparatus 36 by a suitable means such as elevator 37 and conduit 38. Screening apparatus 36 separates the product granules of ammonium sulfate into three different groups: (1) granules finer than those desired, (2) granules within the desired range of size, and (3) granules larger than those desired. These three different groups of granules are collected in hoppers indicated by numbers 39, 40, and 41, respectively. The large granules from hopper 41 are passed via line 42, feeder 43, and line 44 to crusher 46, where they are broken into smaller pieces to be recycled to the blunger. The crushed ammonium sulfate granules are passed via line 47 to line 48 by means of which they are conducted along with the small granules from hopper 39 to blunger 19. The product ammonium sulfate from hopper 40 is passed via line 49 to suitable means for conducting same to storage or bagging such as conveyor 50 and scale 51.

It is within the scope of my invention to manufacture granules of almost any desired size depending only on the number of times the granules are recycled to the blunger.

Figures 2, 3, and 4 are actual photographs of three types of dry ammonium sulfates. These pictures have been enlarged as may be seen by noting the inch scale, so that the crystals in Figures 3 and 4 will be more easily seen and so that the granules of Figure 2 will be of the same relative size as the crystals.

Figure 2 is a picture of ammonium sulfate granules made according to my process. The granules are hard and withstand abrasion very well. One of the particular advantages of their use as fertilizer is that they will dissolve more slowly and will have a more lasting effect on the soil to which they are applied. Figure 3 is a picture of a crystalline ammonium sulfate fertilizer bought on the open market. Note the large lumps which have formed due to bridging and caking of the long needle-like crystals. Figure 4 is a picture of a second crystalline ammonium sulfate fertilizer also bought on the open market. Although the crystals of this material do not appear in large lumps as do those in Figure 3, such lumps were present but were broken by handling of the small quantity photographed. Agglomeration would again take place on storage.

All attempts to purchase granular ammonium sulfate like or similar to that produced according to my process were to no avail. This bears out the fact that, up until my invention, no one has been able to produce a satisfactory ammonium sulfate in granular form which may be used as a fertilizer.

A major advantage of my invention is the decrease in size per weight of material. Granules made according to my process will weigh about 75 pounds per cubic foot whereas crystalline ammonium sulfate will weigh only 55 to 65 pounds per cubic foot. This increase in per volume weight provides substantial economic saving in that bags 4 to 8 inches shorter than standard may be used. This provides a saving of ¼ cent per bag when burlap is used and ½ cent per bag when paper is used. Savings of as much as 80 cents per ton may be made in this way.

Still other advantages of my invention are the production of an ammonium sulfate crystal magma containing small crystals which are not needle-like in shape, and ammonium sulfate crystal magma of high crystal solids content but low viscosity, magma easily handled because of its low viscosity, greater volume of product for the equipment because of the high concentrations of crystal solids in the magma, and product ammonium sulfate granules of a compact character easily handled in conventional farm equipment.

Although this invention has been described and exemplified in terms of its preferred modifications, it is understood that various changes may be made without departing from the spirit and scope of the disclosure and of the claims.

I claim:

1. A process for the production of an improved granular ammonium sulfate which comprises introducing an ammonium sulfate solution to a submerged flame evaporation zone, introducing combustible material to said evaporation zone, burning said combustible material in said zone below the liquid level of said ammonium sulfate and thereby causing the removal of water from said solution and the formation of small crystal nuclei of ammonium sulfate of a length in the range of 1 to 50 microns, said crystal nuclei and said solution forming a magma, removing a portion of said magma to a thickening zone wherein a portion of the solution is removed from the crystals, recycling the separated solution to said evaporation zone for further evaporation, removing another portion of said magma from said evaporation zone and combining therewith the previously thickened magma to form a crystal magma of high crystal solids content, passing said magma of high crystal solids content to a mixing zone wherein it is admixed with recycle dry ammonium sulfate in such quantities that the moisture content of the admixture is not more than 1 to 10 weight per cent, the crystals of said magma and the dry ammonium sulfate adhering to one another in said mixing zone in the form of granules, passing said granules from said mixing zone to a drying zone wherein they are contacted with a drying gas to remove the moisture therefrom, said crystals becoming cemented to said recycle ammonium sulfate by the removal of said moisture and the crystallization of the ammonium sulfate from which said moisture is removed, passing said drying gas to a separation zone wherein entrained ammonium sulfate fines are removed, passing said fines to said mixing zone as recycle ammonium sulfate, separating said ammonium sulfate granules from said dryer and selecting granules of a desired size, recycling granules of too small a size to said mixing zone, passing granules of too large a size to a crushing zone and crushing same to smaller size, recycling said crushed ammonium sulfate granules to said mixing zone, and recovering the granules of desired size.

2. A process according to claim 1 wherein the crystal magma contains 30 to 85 total crystal solids.

3. A process for the production of improved granular ammonium sulfate which comprises introducing to an aqueous ammonium sulfate solution a water-soluble salt of a trivalent metal selected from the group consisting of aluminum, chromium, iron, and manganese as a crystal growth inhibitor, passing said solution to a submerged flame evaporation zone, introducing a combustible material to said evaporation zone, burning said combustible material in said zone below the liquid level of said solution and passing combustion gases upwardly through said solution, removing water in the form of vapor from said solution by the heat of said combustion and by the passage of hot gases through said solution, crystallizing ammonium sulfate out of said solution being evaporated in small crystals whose growth is inhibited by the presence of the crystal growth inhibitor, said crystals and said solution forming a crystal magma, recovering from said evaporation zone an ammonium sulfate crystal magma wherein the average size of said crystals is in the range of 1 to 50 microns, passing said magma to a blunging zone wherein said magma is admixed with recycle dry ammonium sulfate in such quantities that the moisture content of said admixture is not more than 2 to 3 weight per cent, said crystals from said magma adhering to said recycle ammonium sulfate and thereby forming granules, passing said granules from said blunging zone to a drying zone wherein they are contacted with a heated drying gas to remove the moisture therefrom, the ammonium sulfate particles in said granules becoming cemented together by the crystallization of the ammonium sulfate from which said moisture is removed, passing the heated drying gas containing the moisture removed from said granules to a separation zone wherein entrained particles of ammonium sulfate are removed, recycling thus recovered ammonium sulfate to said blunging zone, passing said ammonium sulfate granules from said drying zone to a separation zone wherein granules of the desired size are separated, recycling granules from said separation zone of too small a size to said blunging zone, passing granules of too large a size to a crushing zone wherein they are crushed to a smaller size, recycling said crushed ammonium sulfate to said blunging zone, and recovering the granules of a desired size as a product of the process.

4. A process according to claim 3 wherein the crystal growth inhibitor is added in the quantity in the range of 0.1 to 5.0 weight per cent, based on the dissolved ammonium sulfate.

5. A process according to claim 3 wherein the crystal magma contains 30 to 85 total crystal solids.

6. An improved process for the manufacture of ammonium sulfate granules which comprises introducing aluminum sulfate as a crystal growth inhibitor to an aqueous ammonium sulfate solution in a quantity in the range of 0.1 to 1.0 weight per cent based on the dissolved ammonium sulfate, passing the thus treated ammonium sulfate solution to a submerged flame evaporation zone, introducing propane and air to said evaporation zone, burning said propane and air in said zone below the liquid level of said solution and passing hot combustion gases upwardly through said solution, removing water from said solution in the form of vapor by the heat of said combustion and the passage of said hot gases upwardly through the solution, crystallizing ammonium sulfate out of said solution by said evaporation in small crystals of an average size in the range of 5 to 10 microns whose growth is inhibited by the presence of said aluminum sulfate, said crystals and said solution forming an ammonium sulfate magma, evaporating said ammonium sulfate solution until a crystal magma of a crystal solids content in the range of 30 to 85 per cent is obtained, passing the thus formed magma of high crystal solids content to a blunging zone wherein it is admixed with recycle dry ammonium sulfate in such quantities that the moisture content of the admixture is not more than 2 to 3 weight per cent, said crystals and said recycle ammonium sulfate adhering to one another in the form of granules by the moisture present, passing said granules to a rotating drying zone, burning combustible materials in a combustion zone and passing the product hot gases of said combustion through said drying zone to remove the remaining moisture content of the ammonium sulfate granules, said ammonium sulfate crystals and said recycle ammonium sulfate which have adhered to one another becoming cemented together by the crystallization of the ammonium sulfate from which the moisture is removed by the hot combustion gases, passing the moisture-containing combustion gases to a separation zone wherein entrained ammonium sulfate particles are recovered, scrubbing the combustion gases to remove any ammonia present, recycling the recovered ammonium sulfate particles to said blunging zone, passing the dried ammonium sulfate granules from the rotary dryer to a screening zone wherein granules of the desired size are separated and recovered for use, recycling granules of too small a size to said blunging zone, passing granules of too large a size to a crushing zone wherein they are crushed to a smaller size, and passing the crushed ammonium sulfate back to said blunging zone.

7. A process for the production of improved ammonium sulfate granules which comprises introducing to an aqueous ammonium sulfate solution a water-soluble salt of a trivalent metal selected from the group consisting of aluminum, chromium, iron, and manganese as a crystal growth inhibitor, passing said solution to a submerged flame evaporation zone, introducing a combustible material to said evaporation zone, burning said combustible material in said zone below the liquid level of said solution and passing combustion gases upwardly through said solution, removing water in the form of vapor from said solution by the heat of said combustion and by the passage of gases through said solution, crystallizing ammonium sulfate out of said solution being evaporated in small crystals whose growth is inhibited by the presence of the crystal growth inhibitor, said crystals and said solution forming a crystal magma, removing a portion of said magma to a separation zone wherein the crystals are removed from the ammonium sulfate solution, recycling the separated solution to said evaporation zone for further evaporation, removing another portion of said magma from said evaporation zone and combining therewith the previously separated crystals to form a crystal magma of high crystal solids content wherein the average length of said crystals is 5 to 10 microns, passing said magma to a blunging zone wherein said magma is admixed with recycle dry ammonium sulfate in such quantities that the moisture content of said admixture is not more than 2 to 3 weight per cent, said crystals from said magma adhering to said recycle ammonium sulfate and thereby forming granules, passing said granules from said blunging zone to a drying zone wherein they are contacted with heated drying gas to remove the moisture therefrom, the ammonium sulfate particles in said granules becoming cemented together by the crystallization of the ammonium sulfate from which said moisture is removed, passing the heated drying gas containing the moisture removed from said granules to a separation zone wherein entrained particles of ammonium sulfate are removed, recycling thus recovered ammonium sulfate to said blunging zone, passing said ammonium sulfate granules from said drying zone to a separation zone wherein granules of the desired size are separated, recycling granules from said separation zone of too small a size to said blunging zone, passing granules of too large a size to a crushing zone wherein they are crushed to a smaller size, recycling said crushed ammonium sulfate to said blunging zone, and recovering the granules of a desired size as a product of the process.

8. A process for the production of an improved granular ammonium sulfate which comprises introducing an ammonium sulfate solution to a submerged flame evaporation zone, introducing combustible material to said evaporation zone, burning said combustible material in said zone below the liquid level of said ammonium sulfate and thereby causing the removal of water from said solution and the formation of small crystal nuclei of ammonium sulfate of a length in the range of 1 to 60 microns, said crystal nuclei and said solution forming a magma, removing a portion of said magma to a thickening zone wherein a portion of the solution is removed from the crystal, recycling the separated solution to said evaporation zone for further evaporation, removing another portion of said magma from said evaporation zone and combining therewith the previously thickened magma to form a crystal magma of high crystal solids content, passing said magma of high crystal solids content to a mixture zone wherein it is admixed with recycle dry ammonium sulfate in such quantities that the moisture content of the admixture is not more than 1 to 10 weight per cent, the crystals of said magma and the dry ammonium sulfate adhering to one another in said mixing zone in the form of granules, passing said granules from said mixing zone to a drying zone wherein they are contacted with a drying gas to remove the moisture therefrom and to cement said crystal to said recycle ammonium sulfate by the removal of said moisture and the crystallization of the ammonium sulfate from which said moisture is removed, passing said drying gas to a separation zone wherein entrained ammonium sulfate fines are removed, passing said fines to said mixing zone as recycle ammonium sulfate, and recovering the granular ammonium sulfate.

9. A process for the production of an improved ammonium sulfate crystal magma which comprises introducing to an ammonium sulfate solution a water soluble salt of a trivalent metal selected from the group consisting of aluminum, chromium, iron, and manganese as a crystal growth inhibitor; passing said solution to a submerged flame evaporation zone; introducing combustible material to said evaporation zone, burning said combustible material in said zone below the liquid level of said ammonium sulfate and thereby causing the removal of water from said solution and the formation of small crystal nuclei of ammonium sulfate of a length in the range of 1 to 60 microns said crystal nuclei and said solution forming a magma, removing a portion of said magma to a thickening zone wherein a portion of the solution is removed from the crystals, recycling the separated solution to said evaporation zone for further evaporation, removing another portion of said magma from said evaporation zone and combining therewith the previously thickened magma to form a crystal magma of high crystal solids content; passing said magma of high crystal solids content to a mixing zone wherein it is admixed with recycle dry ammonium sulfate in such quantities that the moisture content of the admixture is not more than 1 to 10 weight per cent; the crystals of said magma and the dry ammonium sulfate adhering to one another in said mixing zone in the form of granules, passing said granules from said mixing zone to a drying zone wherein they are contacted with a drying gas to remove the moisture therefrom and to cement said crystal to said recycle ammonium sulfate by the removal of said moisture and the crystallization of the ammonium sulfate from which said moisture is removed, passing said drying gas to a separation zone wherein entrained ammonium sulfate fines are removed, passing said fines to said mixing zone as recycle ammonium sulfate, and recovering the granular ammonium sulfate.

10. As a new article of manufacture ammonium sulfate in the form of hard granules having a bulk density of at least 65 pounds per cubic foot, comprising a compact agglomerate of ammonium sulfate crystals of an average length in the range of 1 to 50 microns cemented together with a minimum of void space between said crystals by depositing ammonium sulfate from solution and prepared by admixing crystal magma of high solids content containing crystals of average length in the range of 1 to 50 microns with a sufficient quantity of fines devoid of large crystals to produce a product having a moisture content of not more than 1 to 10 weight per cent, and removing the remaining moisture to effect said cementing of the crystals to form solid granules.

SAM P. ROBINSON.

REFERENCES CITED

The following references are of record in the file of this patent:

UNITED STATES PATENTS

| Number | Name | Date |
|---|---|---|
| 1,730,440 | Smith | Oct. 8, 1929 |
| 1,919,707 | Adams et al. | July 25, 1933 |
| 1,936,866 | Van Ackeren | Nov. 28, 1933 |
| 1,976,936 | Harms | Oct. 16, 1934 |
| 2,043,066 | Rumscheidt | June 2, 1936 |
| 2,178,082 | Rayner | Oct. 31, 1939 |
| 2,228,742 | Applebey | June 14, 1941 |
| 2,297,300 | Hardesty et al. | Sept. 29, 1942 |
| 2,347,073 | Beekhuis | Apr. 18, 1944 |
| 2,375,922 | Jeremiassen | May 15, 1945 |
| 2,436,771 | Hood | Feb. 24, 1948 |

OTHER REFERENCES

Kobe et al.: "Evaporation by Submerged Combustion," Ind. and Eng. Chem., vol. 25, No. 9, pages 984–989, Sept. 1933.

Kobe et al.: "Evaporation by Submerged Combustion," Ind. and Eng. Chem., vol. 28, No. 5, pages 589 and 593, May 1936.